Oct. 8, 1929.   E. E. DAVIDSON   1,730,647
TRANSMISSION BELT AND METHOD OF MAKING THE SAME
Filed Nov. 24, 1926
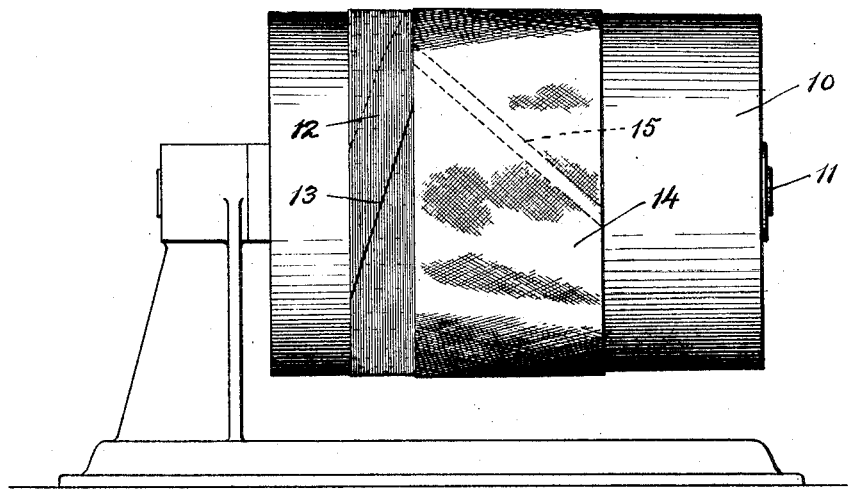
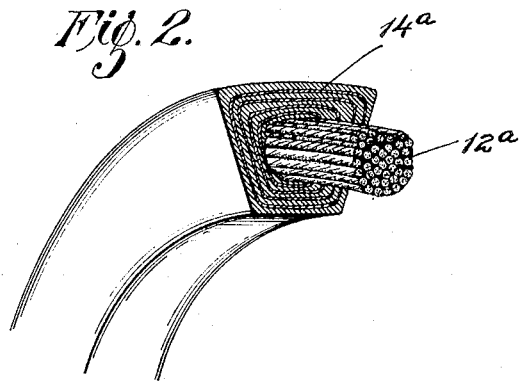
Inventor
Elias E. Davidson
By Pierson, Eakin & Avery,
Attys.

Patented Oct. 8, 1929

1,730,647

UNITED STATES PATENT OFFICE

ELIAS E. DAVIDSON, OF AKRON, OHIO, ASSIGNOR TO THE B. F. GOODRICH COMPANY, OF NEW YORK, N. Y., A CORPORATION OF NEW YORK

TRANSMISSION BELT AND METHOD OF MAKING THE SAME

Application filed November 24, 1926. Serial No. 150,536.

This invention relates to endless, reinforced belts of the side-driving type for use in V-grooved pulleys, and its objects are to provide a belt of this type having high flexibility and durability in service, combined with relatively great strength and small extensibility; also to provide an improved, economical method of working with certain materials to produce such a belt.

Of the accompanying drawings,

Fig. 1 is a side elevation showing a drum or mandrel with the bands for making my improved belt laid up thereon in position for rolling.

Fig. 2 is a perspective, sectional view of a portion of the completed belt.

In the drawings, 10 is a drum or mandrel which is mounted to rotate on a horizontal shaft 11 for convenience in wrapping the belt-making strips or bands of fabric upon the mandrel. Said mandrel may be of any suitable shape such as cylindrical, although preferably, as shown in this case, it has a slight taper and the materials are placed thereon in a position to be rolled "down-hill" or from the larger toward the smaller end of the mandrel to decrease the labor of rolling the limit the amount of stretch imparted to the belt core in the process of rolling.

The belt is made by rolling together a suitable number of bands of different material. In this case, two bands are shown, the first being a core-forming strip of straight-laid, weftless or weak-wefted thread fabric 12, similar to that used in making pneumatic cord tire carcasses, and thinly frictioned or coated with a tacky binder such as vulcanizable soft-rubber compound. This strip, whose ends are cut diagonally and parallel on a long slant, is wrapped in frusto-conical, tubular form about the mandrel, near the larger end thereof, and its ends brought together and overlapped in a seam as shown at 13. Its width is sufficient to make a few plies or convolutions when the band is transversely rolled upon itself.

Immediately adjacent to or axially alongside of the core-forming band 12 is placed the second band or strip 14 to form the outer body or cover of the belt, this being a somewhat wider strip of bias-cut, square-woven fabric, also laid in frusto-conical, tubular form and thinly frictioned or coated with a tacky binder such as vulcanizable rubber compound. The ends of this strip are cut diagonally in a manner similar to the first strip and brought together in a slightly lapped seam 15, which is preferably located on the opposite side of the mandrel from the seam 13, so that the extra thickness caused by the two seams will occur at different places longitudinally of the finished belt. This band 14 is made of sufficient width to form several plies or convolutions when rolled upon itself and thus to build an outer body upon the core to the requisite diameter for a finished belt of the desired transverse thickness.

After the materials are thus placed, the band 12, beginning with the edge thereof nearest the larger end of the mandrel, is rolled upon itself and the core so formed is rolled upon the cover or body band 14 which in turn is rolled upon itself and the finished raw belt is then removed from the smaller end of the mandrel.

The use of straight-laid, laterally coherent thread fabric for the reinforcing core facilitates the rolling of the latter, since the rolling action may be initiated, as by hand, at widely-separated points around the edge of the band, such as two opposite points and then two more between these, and will be transmitted throughout a considerable arc of said circumference, through the circumferentially-disposed threads, to portions of said edge between the points where the operator's hands or other instrumentalities are locally applied. With such material, also, the rolling can commence on a down-hill tapered part of the mandrel and the core-strip can be laid thereon immediately anterior to the cover strip 14, no preliminary stretching of the core as a whole being required. The two strips could be separated by a slight space, instead of abutting as shown.

When the raw belt is removed from the mandrel, I prefer to subject it to a stretching action before vulcanizing. This may be done in any one of a number of ways, as by mounting the belt in a segmental mold and expanding said mold to enlarge the molding cavity to a predetermined diameter, or by forcing the belt into a molding cavity over the frusto-conical entrance member of a mold such as that shown in the Moon Patent No. 1,420,727 of June 27, 1922, or preferably, by mounting the belt in a pair of grooved pulleys, one of which is driven, and drawing one of said pulleys away from the other while propelling the belt. These methods will be readily understood without illustration.

The stretched belt is then vulcanized while held to a length which preserves the tension in the core, and the result will be a belt having very small elongation in service. The cross-section may be either circular or V-shaped, the latter being shown in Fig. 2, where 12ª is the reinforcing core of rolled, straight-laid thread fabric and rubber, and 14ª is the rolled body or cover of bias, square-woven fabric and rubber. The straight-laid core gives longitudinal strength and the bias cover gives flexibility in rounding the pulleys, the combined structure being comparatively incompressible in a lateral direction when made up as described, so that the wear upon the belt due to its wedging in the pulley grooves will be small.

Owing to the use of a band of straight-laid thread fabric rolled upon itself to make a central, reinforcing core, all of the core threads bear their share of the pulling strain in approximately equal proportions, on the tension side of the drive when in operation, while the individual threads have sufficient elasticity to resist the effects of sudden increases of tension. When the belt bends around the pulleys, it tends to increase in width progressively from its outer to its inner periphery, the inner peripheral portions being then under compression, and a core of this character readily accommodates itself to such action. The long, diagonal, lapped splice 13 in the straight-laid core-band is found to be of ample strength, assisted by the rubber binder, when said band is rolled upon itself, the pairs of thread ends being then stepped helically around the belt, and only a single wrap of said band around the mandrel will ordinarily be required.

It will be understood that a core of the described character may be used in belt bodies of different constructions, and the form of embodiment may be otherwise varied without departing from my invention.

I claim:

1. An endless, vulcanized, side-driving belt having a core consisting of a tubular, rubberized fabric band of coherent straight-laid threads transversely rolled upon itself in a plurality of convolutions.

2. An endless, vulcanized, side-driving belt having a core comprising a diagonal-seamed band of straight-laid, substantially weftless, rubberized, thread fabric transversely rolled upon itself in a plurality of convolutions.

3. An endless, vulcanized, side-driving belt having a core comprising a single-wrapped band of straight-laid, substantially-weftless, rubberized, thread fabric having its ends joined in a diagonal, lapped seam, said band being transversely rolled upon itself in a plurality of convolutions.

4. A belt according to claim 1, in which the core is enclosed by a band structure of bias, rubberized, square-woven fabric transversely rolled upon itself in a plurality of convolutions.

5. A process of belt making which comprises wrapping a band of tacky thread fabric upon a tapered mandrel, with the threads thereof laid straightwise, circumferentially about the mandrel, joining the ends of said band in a seam, and rolling said band transversely upon itself, from the larger toward the smaller end of the mandrel.

6. A process of belt making which comprises laying a body-forming band of bias, rubberized, fabric and a core-forming band of straight-laid, rubberized, thread fabric in frusto-conical tubular form in successive positions upon a tapered mandrel, with the core-forming band toward the larger end of said mandrel, rolling said core-forming band upon itself in the direction of the body-forming band to form a core, and rolling said core upon and with the body forming band toward the smaller end of the mandrel.

7. An endless, vulcanized, side-driving belt whose innermost elements is a core of laterally-compacted, longitudinal threads and rubber comprising a lap-spliced band of straight-laid rubberized fabric laterally rolled upon itself, and a flexible, rubberized fabric belt body surrounding said core.

In witness whereof I have hereunto set my hand this 16th day of November, 1926.

ELIAS E. DAVIDSON.